United States Patent
Ishikawa (10) Patent No.: US 10,976,717 B2
(45) Date of Patent: Apr. 13, 2021

(54) INTERFERENCE MONITORING DEVICE

(71) Applicant: FANUC CORPORATION, Yamanashi (JP)

(72) Inventor: Yasuhito Ishikawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 33 days.

(21) Appl. No.: 16/393,105

(22) Filed: Apr. 24, 2019

(65) Prior Publication Data

US 2019/0332083 A1 Oct. 31, 2019

(30) Foreign Application Priority Data

Apr. 27, 2018 (JP) .............................. JP2018-086741

(51) Int. Cl.
  *G05B 19/31* (2006.01)
  *G05B 19/4097* (2006.01)
  *G05B 19/404* (2006.01)

(52) U.S. Cl.
  CPC .......... *G05B 19/31* (2013.01); *G05B 19/404* (2013.01); *G05B 19/4097* (2013.01); *G05B 2219/49153* (2013.01)

(58) Field of Classification Search
  CPC .. G05B 19/31; G05B 19/404; G05B 19/4061; G05B 19/4097; G05B 2219/49153
  USPC ......................................................... 700/186
  See application file for complete search history.

(56) References Cited

U.S. PATENT DOCUMENTS

| 5,815,400 A * | 9/1998 | Hirai .................... G05B 19/401 700/173 |
| 2012/0203373 A1* | 8/2012 | Lee ..................... G05B 19/4097 700/180 |

FOREIGN PATENT DOCUMENTS

| JP | 4221016 | | 2/2009 |
| JP | 2010-231737 | | 10/2010 |
| JP | 2010-244256 | | 10/2010 |
| JP | 2011-14029 | | 1/2011 |
| JP | 2011014029 A | * | 1/2011 ......... G05B 19/4155 |

OTHER PUBLICATIONS

Office Action dated Jul. 21, 2020 in corresponding Japanese Patent Application No. 2018-086741.

* cited by examiner

*Primary Examiner* — Chad G Erdman
(74) *Attorney, Agent, or Firm* — Wenderoth, Lind & Ponack, L.L.P.

(57) ABSTRACT

The interference monitoring device comprises: an advanced position calculation unit that calculates an advanced position of the tool or the workpiece ahead by a predetermined period of time based on the program; an interference check unit that draws an estimated shape of a machined part of the workpiece after machining based on the advanced position, and makes the interference check based on the estimated shape of the machined part of the workpiece in the drawing; and an uncut region calculation unit that calculates an error between the estimated shape of the machined part of the workpiece in the drawing and an actual shape of the machined part of the workpiece after machining as an uncut region in the estimated shape of the machined part of the workpiece in the drawing. The interference check unit does not make the interference check in the uncut region.

5 Claims, 9 Drawing Sheets

INTERFERENCE MONITORING DEVICE

This application is based on and claims the benefit of priority from Japanese Patent Application No. 2018-086741, filed on 27 Apr. 2018, the content of which is incorporated herein by reference.

BACKGROUND OF THE INVENTION

Field of the Invention

The present invention relates to an interference monitoring device that checks interference between a tool and a workpiece in a machine for performing predetermined machining on the workpiece while moving the tool and the workpiece relative to each other based on a program.

Related Art

In a machine tool, for example, a tool and a workpiece are moved relative to each other based on a program prepared in advance to machine the workpiece. In the presence of a mistake in the program or in the presence of a mistake in attachment of the workpiece to the machine, for example, interference may occur such as collision of the tool with the workpiece or with a jig for attachment of the workpiece while the machine is running.

In this regard, an interference monitoring device has been devised (Patent Document 1, for example). In this interference monitoring device, an advanced position (advanced preview position) of a tool or a workpiece ahead by a predetermined period of time is calculated through look-ahead of a program, and interference between the tool and the workpiece is checked based on the calculated advanced position. If interference is expected to occur, movement of the tool or the workpiece is decelerated and stopped.

Patent Document 1: Japanese Patent No. 4221016

SUMMARY OF THE INVENTION

The present inventor has come up with an idea of making an interference check using an interference monitoring device. According to this check, while estimated cutting from a workpiece is drawn, in other words, while an estimated shape of a machined part of the workpiece after machining is drawn, an interference check is made based on the estimated shape of the machined part of the workpiece in the drawing. This idea has the following problem.

Figure 3A:
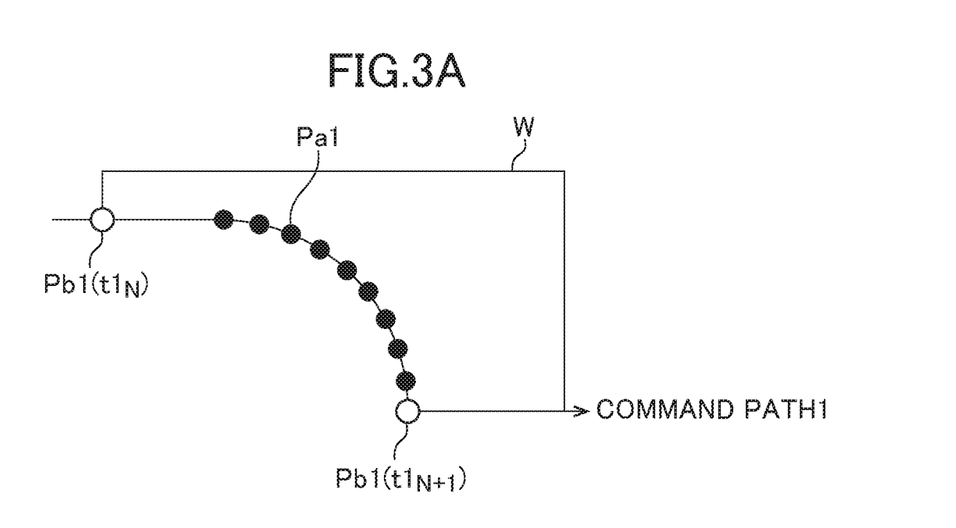
FIG. 3A shows a problem about an interference monitoring device.

As shown in FIG. 3A, for example, command end points (tiny continuous blocks) Pa1 are given on a command path 1 in actual control. Meanwhile, an interference monitoring device calculates an advanced position Pb1 corresponding to each of time $t1_N$ and time $t1_{N+1}$ ahead by a predetermined period of time through look-ahead of a program. This makes an interval between points in a sequence of the advanced positions Pb1 larger than an interval between the command end points Pa1, whereby an intermediate coordinate corresponding to the command end point Pa1 cannot be calculated.

Figure 3B:
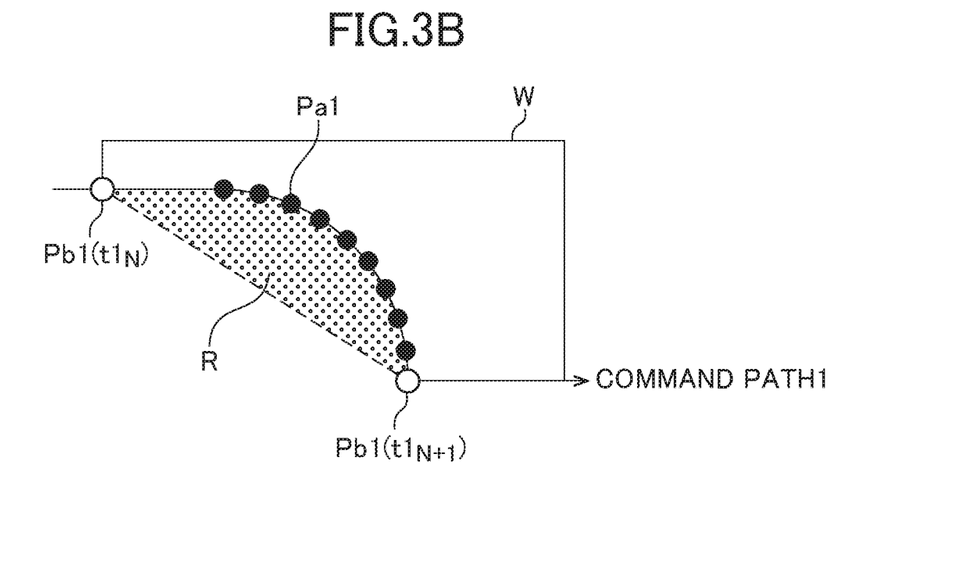
FIG. 3B shows the problem about the interference monitoring device.

When the interference monitoring device draws an estimated shape of a machined part of a workpiece W after machining based on the advanced positions Pb1, an error is caused between the estimated shape of the machined part of the workpiece W in the drawing (dashed line in a straight line between the advanced positions Pb1, for example) and an actual shape of the machined part of the workpiece W after machining (solid line along the command end points Pa1, for example), as shown in FIG. 3B (this error will also be called an uncut region R). The uncut region R is a region cut from the actual shape of the machined part of the workpiece W after machining but is erroneously recognized as an uncut region in the estimated shape of the machined part of the workpiece W in the drawing.

Figure 3C:
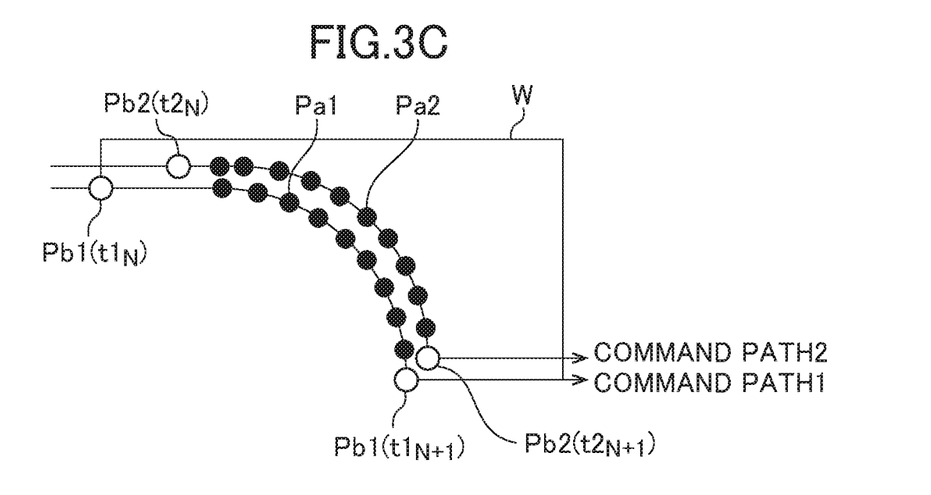
FIG. 3C shows the problem about the interference monitoring device.
Figure 3D:
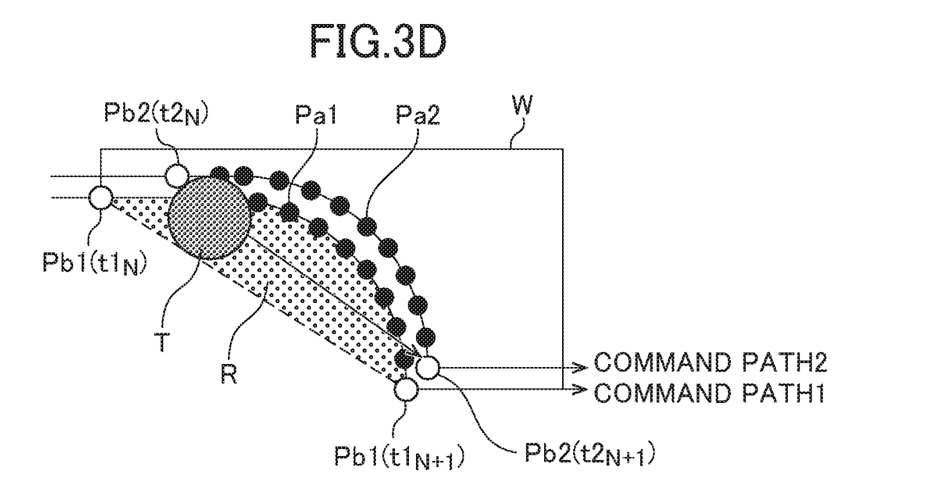
FIG. 3D shows the problem about the interference monitoring device.
Figure 3E:
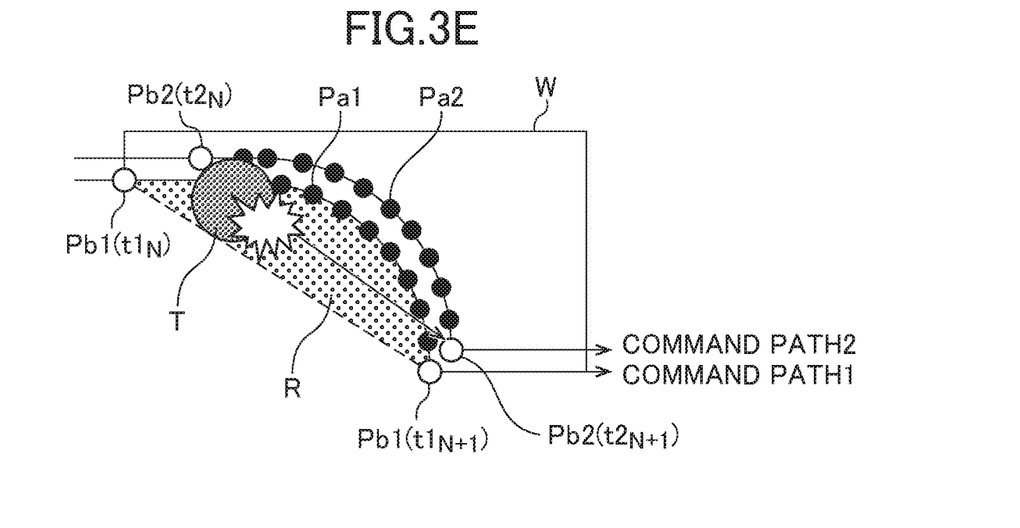
FIG. 3E shows the problem about the interference monitoring device.

As shown in FIG. 3C, cutting along a command path 2 adjacent to the last command path 1 may be commanded thereafter. As shown in FIG. 3D, if the interference monitoring device calculates an advanced position Pb2 on the command path 2 corresponding to each of time $t2_N$ and time $t2_{N+1}$ and makes an interference check along a straight line connecting the advanced positions Pb2, a cutting volume in the uncut region R is recognized erroneously as being equal to or more than a predetermined value. Hence, the interference monitoring device makes an erroneous detection that interference between a tool T and the workpiece W has occurred as shown in FIG. 3E. This unintentionally results in stopping of the running of a machine tool, for example, despite the absence of interference between the tool T and the workpiece W in actuality.

The present invention is intended to provide an interference monitoring device that avoids erroneous detection of interference between a tool and a workpiece.

(1) An interference monitoring device according to the present invention (interference monitoring device 100 described later, for example) makes a check on interference between a tool and a workpiece in a machine for performing predetermined machining on the workpiece while moving the tool and the workpiece relative to each other based on a program. The interference monitoring device comprises: an advanced position calculation unit (advanced position calculation unit 15 described later, for example) that calculates an advanced position of the tool or the workpiece ahead by a predetermined period of time based on the program; an interference check unit (interference check device 2 described later, for example) that draws an estimated shape of a machined part of the workpiece after machining based on the advanced position, and makes the interference check based on the estimated shape of the machined part of the workpiece in the drawing; and an uncut region calculation unit (uncut region calculation unit 16 described later, for example) that calculates an error between the estimated shape of the machined part of the workpiece in the drawing and an actual shape of the machined part of the workpiece after machining as an uncut region in the estimated shape of the machined part of the workpiece in the drawing. The interference check unit does not make the interference check in the uncut region.

(2) In the interference monitoring device described in (1), the uncut region calculation unit may calculate a maximum width in the uncut region. When an offset width between an estimated path based on an advanced position on a last command path and an estimated path based on an advanced position on a current command path is equal to or less than the maximum width in the uncut region, the interference check unit may determine that the current command path is to pass through the uncut region, and may not make the interference check.

(3) In the interference monitoring device described in (2), the uncut region calculation unit may calculate traveling direction vectors via from a calculated advanced position corresponding to time $t_N$ to multiple command positions, and calculate a traveling direction vector vib from the calculated advanced position corresponding to the time $t_N$ to a calculated advanced position corresponding to time $t_{N+1}$. The multiple command positions are command positions between the calculated advanced position corresponding to the time $t_N$ and the calculated advanced position corresponding to the time $t_{N+1}$. The uncut region calculation unit may convert the traveling direction vector vib to a unit vector. The uncut region calculation unit may calculate the absolute value of the outer product of the unit vector and each of the traveling direction vectors via, thereby obtaining a normal direction offset width of each of the traveling direction vectors via to the traveling direction vector vib. The uncut region calculation unit may define a maximum of the offset widths as the maximum width in the uncut region.

(4) In the interference monitoring device described in (1), the uncut region calculation unit may calculate an area in the uncut region. When an area of current machining is equal to or less than the area in the uncut region, the interference check unit may determine that the current machining is being performed in the uncut region and may not make the interference check.

(5) In the interference monitoring device described in (4), the uncut region calculation unit may calculate traveling direction vectors vi from a calculated advanced position corresponding to time $t_N$ to multiple command positions, and calculate a traveling direction vector vi from the calculated advanced position corresponding to the time $t_N$ to a calculated advanced position corresponding to time $t_{N+1}$. The multiple command positions are command positions between the calculated advanced position corresponding to the time $t_N$ and the calculated advanced position corresponding to the time $t_{N+1}$. The uncut region calculation unit may obtain an area si in a region surrounded by the traveling direction vector vi and a traveling direction vector vi+1 adjacent to each other. The uncut region calculation unit may define the total sum of the areas si from the time $t_N$ to the time $t_{N+1}$ as the area in the uncut region.

According to the present invention, the interference monitoring device can avoid erroneous detection of interference between the tool and the workpiece.

DETAILED DESCRIPTION OF THE INVENTION

Examples of an embodiment of the present invention will be described below by referring to the accompanying drawings. In the drawings, corresponding or comparable parts are identified by the same sign.

First Embodiment

Figure 1:
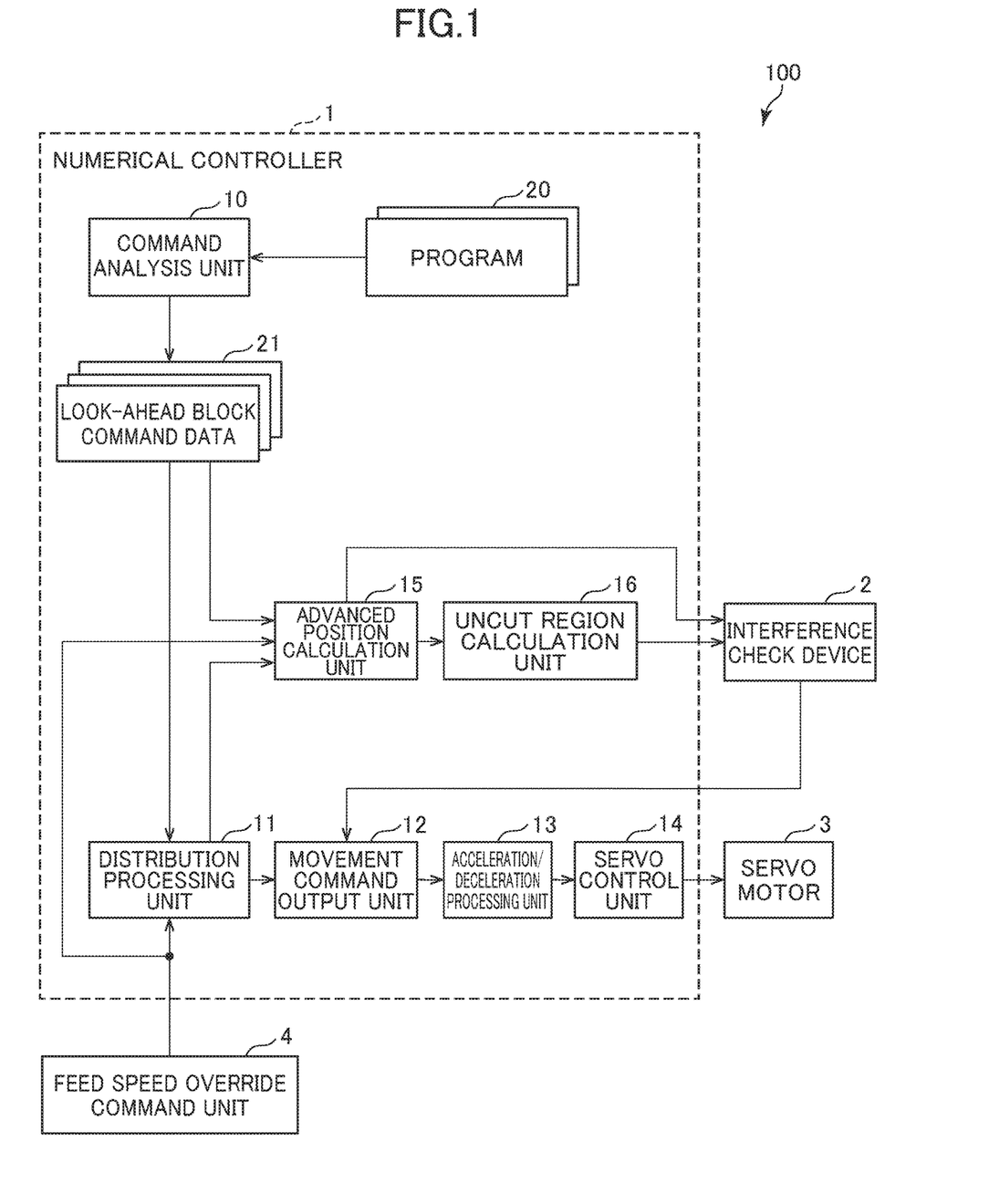
FIG. 1 shows the configuration of an interference monitoring device according to an embodiment.

FIG. 1 shows the configuration of an interference monitoring device according to a first embodiment. An interference monitoring device 100 shown in FIG. 1 includes a numerical controller 1 and an interference check device (interference check unit) 2. The interference monitoring device 100 is not limited to such a configuration with the two devices and can be configured as one device. The numerical controller 1 moves a tool based on a program to control a machine tool (a servo motor 3, for example) for performing machining, such as cutting, on a workpiece. The numerical controller 1 calculates an advanced position of the tool based on the program. The interference check device 2 checks interference between the tool and the workpiece based on the calculated advanced position.

The numerical controller 1 includes a command analysis unit 10, a distribution processing unit 11, a movement command output unit 12, an acceleration/deceleration processing unit 13, a servo control unit 14, an advanced position calculation unit 15, and an uncut region calculation unit 16.

The command analysis unit 10 reads a command corresponding to one block from a program 20, converts the read command to data in an execution format, and generates look-ahead block command data 21. The command analysis unit 10 stores the look-ahead block command data 21 into a working memory (not shown), for example.

The distribution processing unit 11 reads pieces of the look-ahead block command data 21 one by one corresponding to one block. Based on the stroke and speed of each axis commanded in the block, and an override value (%) commanded through a feed speed override command unit 4, the distribution processing unit 11 determines a distributed stroke in each distribution cycle to be given as a command to a movable part of each axis (a servo motor of each axis). The distribution processing unit 11 adds the determined distributed strokes to a current position register (not shown), for example, thereby updating a current coordinate position (hereafter called a current position).

The distribution processing unit 11 outputs the determined distributed strokes to the acceleration/deceleration processing unit 13 through the movement command output unit 12. As will be described later, in response to input of an axis stop command from the interference check device 2, the movement command output unit 12 stops output of the distributed strokes in a movement command, having been output from the distribution processing unit 11, to the acceleration/deceleration processing unit 13. Further, the movement command output unit 12 outputs the movement command to the acceleration/deceleration processing unit 13 in the absence of input of an axis stop command from the interference check device 2.

The acceleration/deceleration processing unit 13 performs acceleration/deceleration processing in response to receipt of the movement command, and outputs a movement command containing a stroke resulting from the acceleration/deceleration processing to the servo control unit 14. The servo control unit 14 executes position feedback control and speed feedback control based on the output movement command, and a position feedback from a position detector and a speed feedback from a speed detector attached to the servo motor 3 (or a movable part to be driven by the servo motor 3). Further, the servo control unit 14 executes current feedback control based on a current feedback from a current detector for detection of a driving current, and controls drive of the servo motor 3 through an amplifier. While only one servo motor 3 is shown in FIG. 1, servo motors for all axes (all movable parts) belonging to a machine tool are to be controlled in the same way to control the respective positions and speeds of the movable parts.

The advanced position calculation unit 15 is functional means that determines an advanced position showing a position to which a movable part driven by the servo motor 3 is to move from a current position after passage of an advanced period of time. The advanced position is calculated based on the current position of the movable part, the set advanced period of time, the look-ahead block command data 21, and an override value (%) input through the feed speed override command unit 4. The advanced position calculation unit 15 outputs the advanced period of time and the coordinate value of the advanced position to the interference check device 2 for making an interference check.

The advanced period of time used by the advanced position calculation unit 15 is a value determined by adding a predetermined period of spare time a to a value (TP1+TP2+TP3) obtained by adding a period of time TP1 required for the interference check device 2 to make an interference check, a period of time TP2 required for communication between the advanced position calculation unit 15 and the interference check device 2, and a period of time TP3 required for decelerating and stopping a movable part being moved. Once this system configuration is determined, the period of time TP2 for communication between the advanced position calculation unit 15 and the interference check device 2 generally takes a constant value with substantially no change and can be obtained by measurement. The period of time TP3 required for decelerating and stopping is a constant value determined according to the configuration of the acceleration/deceleration processing unit 13. By contrast, the period of time TP1 required for the interference check device 2 to make an interference check change according to the operating positions of multiple movable parts. Meanwhile, giving attention to the point that the position of a movable part intended to be subjected to an interference check following the current time is generally near the position of the movable part having been subjected to the last interference check, a period of time required for an interference check having been made immediately before by the interference check device 2 may be fed back to the advanced position calculation unit 15 to use the advanced period of time, and this period of time can be used as the period of time TP1 required for an interference check. Alternatively, the interference check device 2 or the advanced position calculation unit 15 to use the advanced period of time may determine an average of periods of time spent in interference checks in the past having been made immediately before (an average of periods of time spent in the last interference check, in the last but one interference check, in the last but two interference check, . . . ). The determined average may be used as the period of time TP1 required for an interference check.

The interference check device 2 has stored the contour shape of a tool or a workpiece, the contour shape of a machine, etc. when the interference check device 2 receives the advanced period of time and the coordinate value of the advanced position from the advanced position of the calculation unit 15. The interference check device 2 makes a check to determine whether interference is to occur between the tool and the workpiece based on the position of each movable part transmitted from the advanced position calculation unit 15, and outputs an axis stop command to the movement command output unit 12 based on a result of the check. The interference check device 2 is configured using an information processor such as a personal computer. Further details of the processing performed by the advanced position calculation unit 15 and the interference check device 2 will not be described in this specification as they are known publicly from a conventional technique such as that described in Patent Document 1.

The interference check device 2 may be a device by which, while estimated cutting from a workpiece is drawn, in other words, while an estimated shape of a machined part of the workpiece after machining is drawn, an interference check is made based on the estimated shape of the machined part of the workpiece in the drawing. In this case, the following problem arises. As shown in FIG. 3A, for example, in actual control by the distribution processing unit 11, the acceleration/deceleration processing unit 13, and the servo control unit 14, command end points (tiny continuous blocks) Pa1 are given on a command path 1. Meanwhile, the advanced position calculation unit 15 calculates an advanced position Pb1 corresponding to each of time $t1_N$ and time $t1_{N+1}$ ahead by a predetermined period of time based on the look-ahead block command data 21. This makes an interval between points in a sequence of the advanced positions Pb1 larger than an interval between the command end points Pa1, whereby an intermediate coordinate corresponding to the command end point Pa1 cannot be calculated.

When the interference check device 2 draws an estimated shape of a machined part of a workpiece W after machining based on the advanced positions Pb1, an error is caused between the estimated shape of the machined part of the workpiece W in the drawing (dashed line in a straight line between the advanced positions Pb1, for example) and an actual shape of the machined part of the workpiece W after machining (solid line along the command end points Pa1, for example), as shown in FIG. 3B (this error will also be called an uncut region R). The uncut region R is a region cut from the actual shape of the machined part of the workpiece W after machining but is erroneously recognized as an uncut region in the estimated shape of the machined part of the workpiece W in the drawing.

As shown in FIG. 3C, cutting along a command path 2 adjacent to the last command path 1 may be commanded thereafter. As shown in FIG. 3D, if the advanced position calculation unit 15 calculates an advanced position Pb2 on the command path 2 corresponding to each of time $t2_N$ and time $t2_{N+1}$ and the interference check device 2 makes an interference check along a straight line connecting the advanced positions Pb2, a cutting volume in the uncut region R is recognized erroneously as being equal to or more than a predetermined value. Hence, the interference check device 2 makes an erroneous detection that interference between a tool T and the workpiece W has occurred as shown in FIG. 3E. This unintentionally results in stopping of the running of a machine tool, for example, despite the absence of interference between the tool T and the workpiece W in actuality.

Figure 4:
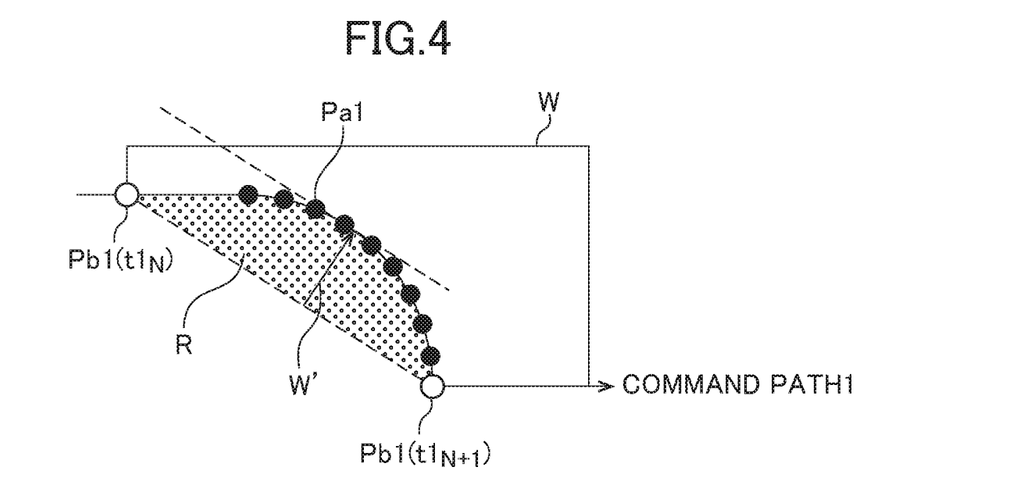
FIG. 4 shows the function of an uncut region calculation unit in the interference monitoring device according to the first embodiment.

In this regard, as shown in FIG. 4, the uncut region calculation unit 16 calculates an error between the estimated shape of the machined part of the workpiece W in the drawing (dashed line in a straight line between the advanced positions Pb1, for example) and an actual shape of the machined part of the workpiece W after machining (solid line along the command end points Pa1, for example) as the uncut region R in the estimated shape of the machined part of the workpiece W in the drawing. For example, the uncut region calculation unit 16 calculates a maximum width W' in the uncut region R.

Figure 5:
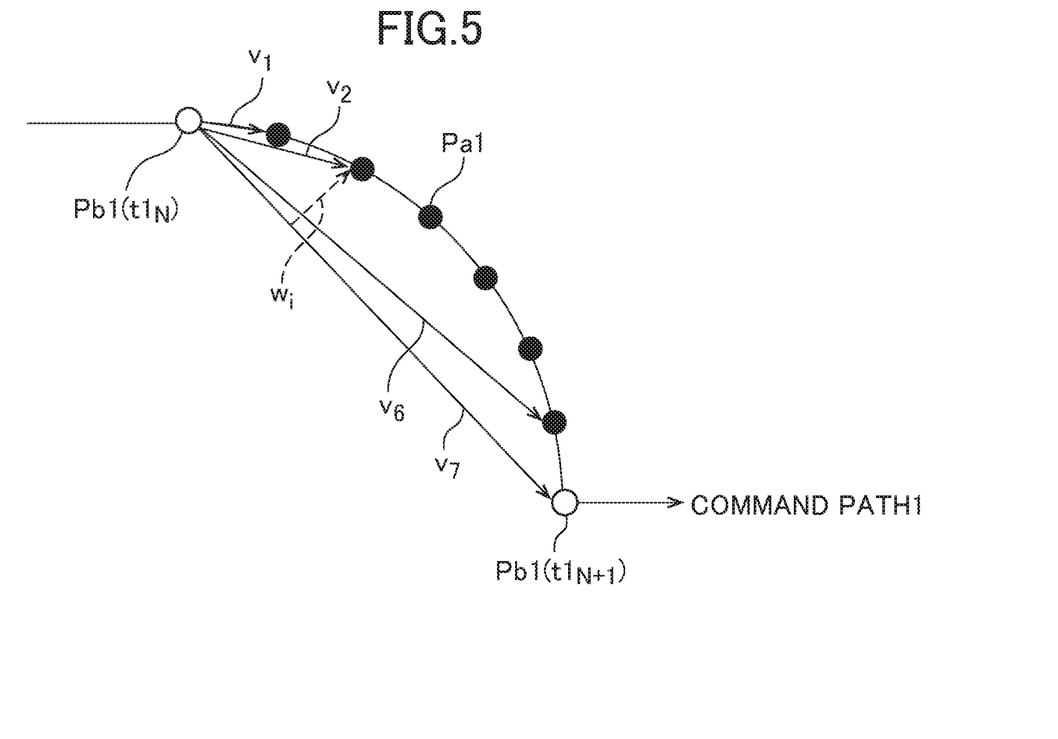
FIG. 5 shows the function of the uncut region calculation unit in the interference monitoring device according to the first embodiment.

More specifically, as shown in FIG. 5, the uncut region calculation unit 16 calculates traveling direction vectors vi from the calculated advanced position Pb1 corresponding to the time $t1_N$ to multiple command end points Pa1 (for example, vi=via=v1 to v6) and a traveling direction vector vi from the calculated advanced position Pb1 corresponding to the time $t1_N$ to the calculated advanced position Pb1 corresponding to the time $t1_{N+1}$ (for example, vi=vib=v7). The command end points Pa1 on the command path 1 can be acquired from the look-ahead block command data 21 through the advanced position calculation unit 15. The uncut region calculation unit 16 converts the traveling direction vector v7 from the calculated advanced position Pb1 corresponding to the time $t1_N$ to the calculated advanced position Pb1 corresponding to the time $t1_{N+1}$ to a unit vector e7, and calculates the absolute value of the outer product of the unit vector e7 and each of the traveling direction vectors vi (for example, v1 to v6) as shown in the following formula, thereby obtaining a normal direction offset width wi of each of v1 to v6 from v7:

$$wi=|e7 \times vi|.$$

The uncut region calculation unit 16 defines a maximum of the offset widths wi as the maximum width W' in the uncut region R, and outputs the maximum width W' to the interference check device 2.

The interference check device 2 does not make an interference check in the uncut region R. In other words, the interference check device 2 handles the uncut region R as a region not to be targeted for an interference check. This makes it possible to avoid erroneous detection of interference between the tool T and the workpiece W.

Figure 6:
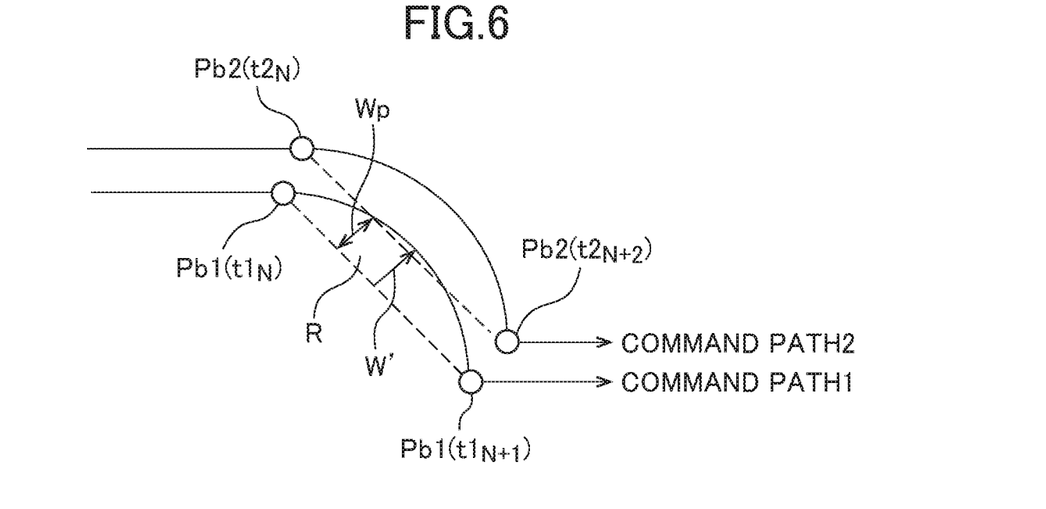
FIG. 6 shows the function of an interference check device in the interference monitoring device according to the first embodiment.

As shown in FIG. 6, when an offset width Wp between an estimated path based on the calculated advanced positions Pb1 on the last command path 1 corresponding to the time $t1_N$ and the time $t1_{N+1}$ (dashed line in a straight line between Pb1) and an estimated path based on the calculated advanced positions Pb2 on the current command path 2 corresponding to the time $t2_N$ and the time $t2_{N+1}$ (dashed line in a straight line between Pb2) is equal to or less than the maximum width W' in the uncut region R acquired from the uncut region calculation unit 16, for example, the interference check device 2 determines that the current command path 2 is to pass through the uncut region R. In this case, the interference check device 2 does not check interference between the tool T and the workpiece W. The offset width Wp may be a maximum distance between the estimated path based on the advanced positions Pb1 (dashed line in a straight line between Pb1) and the estimated path based on the advanced positions Pb2 (dashed line in a straight line between Pb2). The maximum width W' can also be compensated for in consideration of a tool shape.

Figure 2:
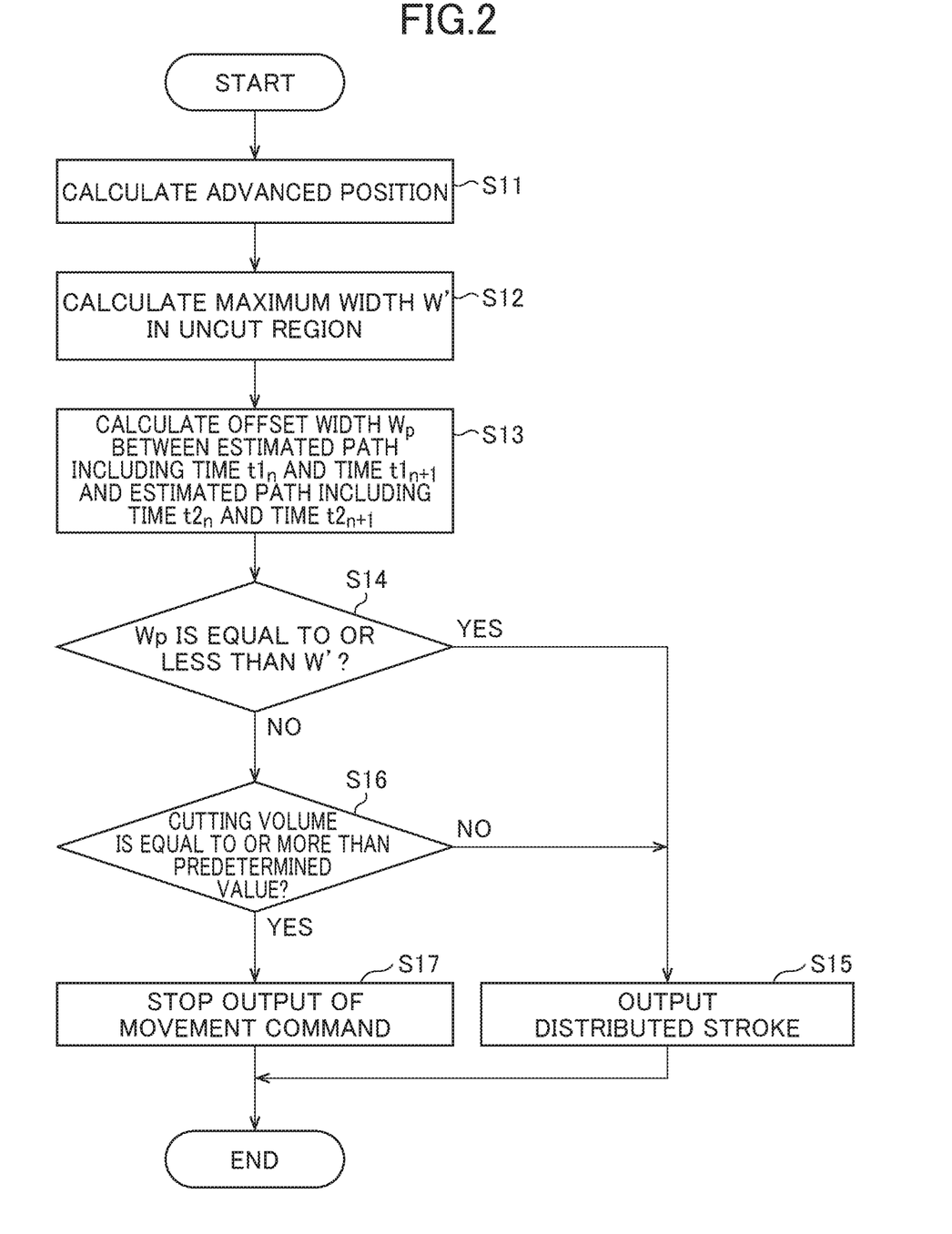
FIG. 2 is a flowchart showing interference check operation by an interference monitoring device according to a first embodiment.

Interference check operation by the interference monitoring device 100 according to the first embodiment will be described next by referring to FIG. 2. FIG. 2 is a flowchart showing the interference check operation by the interference monitoring device 100 according to the first embodiment.

Preliminary Processing

In preliminary processing, the command analysis unit 10 first reads a command corresponding to one block from the program 20, converts the read command to data in an execution format, and generates the look-ahead block command data 21. The command analysis unit 10 stores the look-ahead block command data 21 into the working memory, for example.

Execution Processing

Next, in execution processing, the distribution processing unit 11 reads pieces of the look-ahead block command data 21 one by one corresponding to one block. Further, the distribution processing unit 11 acquires an override value through the feed speed override command unit 4. Based on a stroke and a speed of each axis commanded in the read block and the acquired override value, the distribution processing unit 11 calculates a distributed stroke in each distribution cycle to be given as a command to a movable part of each axis (a servo motor of each axis), and outputs the calculated distributed strokes to the movement command output unit 12. Further, the distribution processing unit 11 adds the calculated distributed strokes to the current position register, thereby updating a current coordinate position.

The advanced position calculation unit 15 calculates the advanced position Pb1 on the command path 1 corresponding to each of the time $t1_N$ and the time $t1_{N+1}$ ahead by a predetermined period of time based on the current position of the movable part, a set advanced period of time, the look-ahead block command data 21, and the override value (%) input through the feed speed override command unit 4 (S11) (see FIG. 4). Next, as shown in FIGS. 4 and 5, the uncut region calculation unit 16 calculates an error between an estimated shape of a machined part of the workpiece W in a drawing (dashed line in a straight line between the advanced positions Pb1, for example) and an actual shape of the machined part of the workpiece W after machining (solid line along the command end points Pa1, for example) as the uncut region R in the estimated shape of the machined part of the workpiece W in the drawing, and calculates the maximum width W' in the uncut region R (S12).

Next, as shown in FIG. 6, the interference check device 2 calculates the offset width Wp between an estimated path based on the calculated advanced positions Pb1 on the last command path 1 corresponding to the time $t1_N$ and the time $t1_{N+1}$ (dashed line in a straight line between Pb1) and an estimated path based on the calculated advanced positions Pb2 on the current command path 2 corresponding to the time $t2_N$ and the time $t2_{N+1}$ (dashed line in a straight line between Pb2) (S13). The interference check device 2 determines whether the calculated offset width Wp is equal to or less than the maximum width W' in the uncut region R acquired from the uncut region calculation unit 16 (S14).

When the offset width Wp is equal to or less than the maximum width W', the interference check device 2 determines that the current command path 2 is to pass through the uncut region R, and the interference check device 2 does not check interference between the tool T and the workpiece W and does not output an axis stop command to the movement command output unit 12. In this case, the movement command output unit 12 outputs the distributed strokes (S15), the acceleration/deceleration processing unit 13 performs acceleration/deceleration processing, and the servo control unit 14 gives a command to drive the servo motor 3.

Meanwhile, when the offset width Wp is greater than the maximum width W', the interference check device 2 determines that current machining is being performed in a region other than the uncut region R. Then, the interference check device 2 checks interference between the tool T and the workpiece W at the advanced positions Pb2. When a cutting volume is equal to or more than a predetermined value (when YES in S16), the interference check device 2 outputs an axis stop command to the movement command output unit 12. In response to this, the movement command output unit 12 stops output of a movement command (S17) to stop the command to drive the servo motor 3. When the interference check device 2 determines that the cutting volume is less than the predetermined value (when NO in S16) as a result of making of a check of interference between the tool T and the workpiece W at the advanced positions Pb2, the interference check device 2 does not output an axis stop command to the movement command output unit 12. In response to this, the foregoing process in step S15 is performed. The foregoing operation is repeated for every block in the program and in every distribution cycle.

As described above, according to the interference monitoring device 100 of the first embodiment, the uncut region calculation unit 16 in the numerical controller 1 calculates an error between the estimated shape of the machined part of the workpiece W in the drawing and an actual shape of the machined part of the workpiece W after machining as the uncut region R in the estimated shape of the machined part of the workpiece W in the drawing. The interference check device 2 does not make an interference check in the uncut region R. This makes it possible to avoid erroneous detection of interference between the tool T and the workpiece W despite the absence of interference between the tool T and the workpiece W in the uncut region R in actuality.

Second Embodiment

In the first embodiment, erroneous detection of interference between the tool T and the workpiece W is avoided by calculating the maximum width W in the uncut region R. In a second embodiment, erroneous detection of interference between the tool T and the workpiece W is avoided by calculating an area S in the uncut region R.

Figure 8:
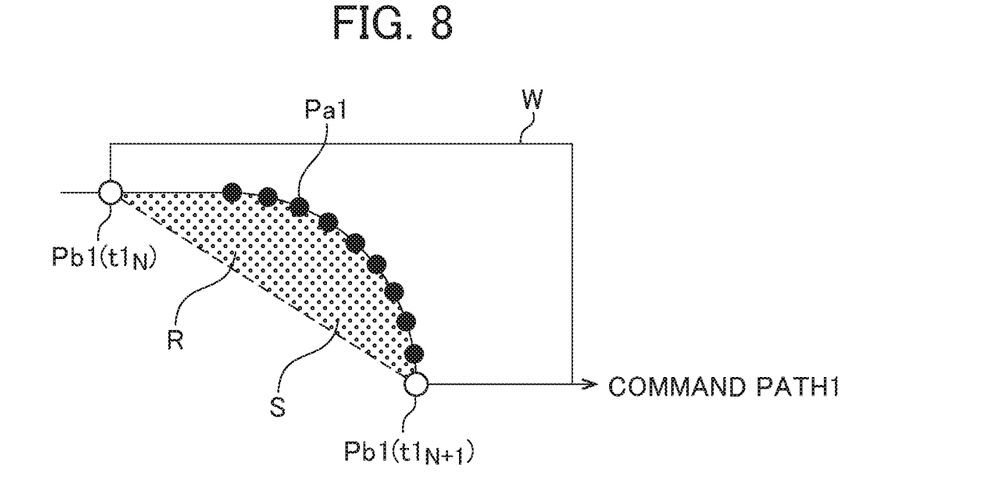
FIG. 8 shows the function of an uncut region calculation unit in the interference monitoring device according to the second embodiment.

In a numerical controller 1 according to the second embodiment, the uncut region calculation unit 16 functions and operates in different ways from that of the numerical controller 1 shown in FIG. 1. As shown in FIG. 8, the uncut region calculation unit 16 calculates an error between an estimated shape of a machined part of the workpiece W in a drawing (dashed line in a straight line between the advanced positions Pb1, for example) and an actual shape of the machined part of the workpiece W after machining (solid line along the command end points Pa1, for example) as the uncut region R in the estimated shape of the machined part of the workpiece W in the drawing. For example, the uncut region calculation unit 16 calculates the area S in the uncut region R.

Figure 9:
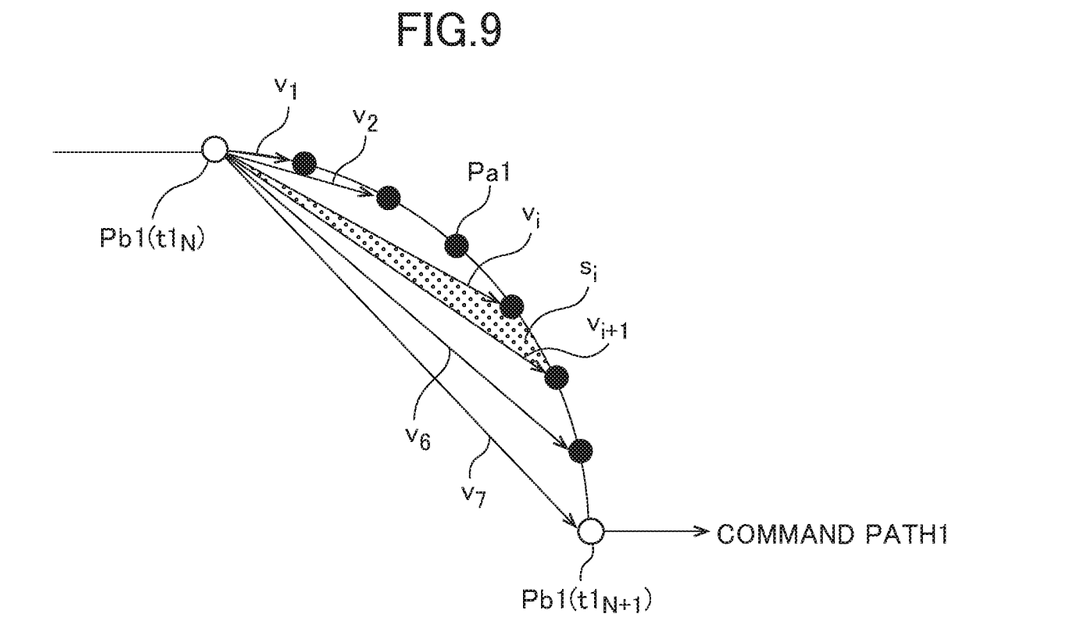
FIG. 9 shows the function of the uncut region calculation unit in the interference monitoring device according to the second embodiment.

More specifically, as shown in FIG. 9, the uncut region calculation unit 16 calculates traveling direction vectors vi from the calculated advanced position Pb1 corresponding to the time $t1_N$ to the multiple command end points Pa1 (for example, v1 to v6) and a traveling direction vector vi from the calculated advanced position Pb1 corresponding to the time $t1_N$ to the calculated advanced position Pb1 corresponding to the time $t1_{N+1}$ (for example, v7). The command end points Pa1 on the command path 1 can be acquired from the look-ahead block command data 21 through the advanced position calculation unit 15. The uncut region calculation unit 16 obtains an area si in a region surrounded by a traveling direction vector vi and a traveling direction vector vi+1 adjacent to each other as shown in the following formula:

$$si=|vi \times vi+1|/2.$$

The uncut region calculation unit 16 obtains the total sum of the areas si from the time $t1_N$ to the time $t1_{N+1}$ as the area S in the uncut region R as shown in the following formula, and outputs the obtained area S to the interference check device 2:

$$S=\Sigma si,$$

where $\Sigma$: sum for i=1 to 6.

Figure 10:
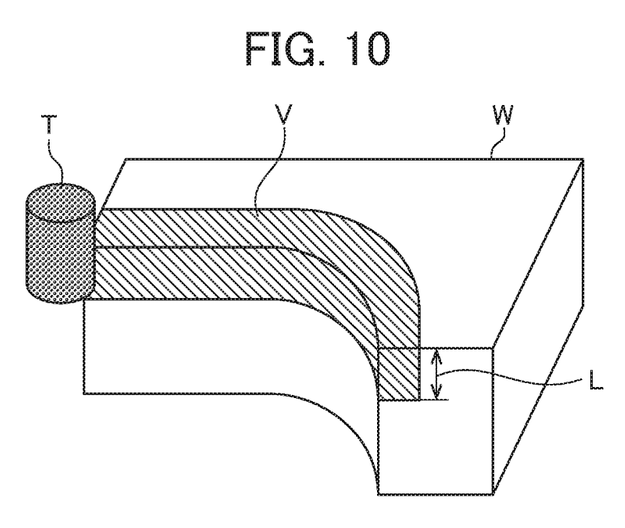
FIG. 10 shows the function of an interference check device in the interference monitoring device according to the second embodiment.

The interference check device 2 does not make an interference check in the uncut region R. In other words, the interference check device 2 handles the uncut region R as a region not to be targeted for an interference check. This makes it possible to avoid erroneous detection of interference between the tool T and the workpiece W. For example, when a cut area Sp determined by passing through an estimated path based on the calculated advanced positions Pb2 on the current command path 2 corresponding to the time $t2_N$ and the time $t2_{N+1}$ is equal to or less than the area S in the uncut region R acquired from the uncut region calculation unit 16, the interference check device 2 determines that the current command path 2 is to pass through the uncut region R. In this case, the interference check device 2 does not check interference between the tool T and the workpiece W. As shown in FIG. 10, the cut area Sp may be an area per unit length determined by dividing a cutting volume V by a length L. Alternatively, the cut area Sp may be an average of areas per unit length. The area S may be compensated for in consideration of a tool shape.

Figure 7:
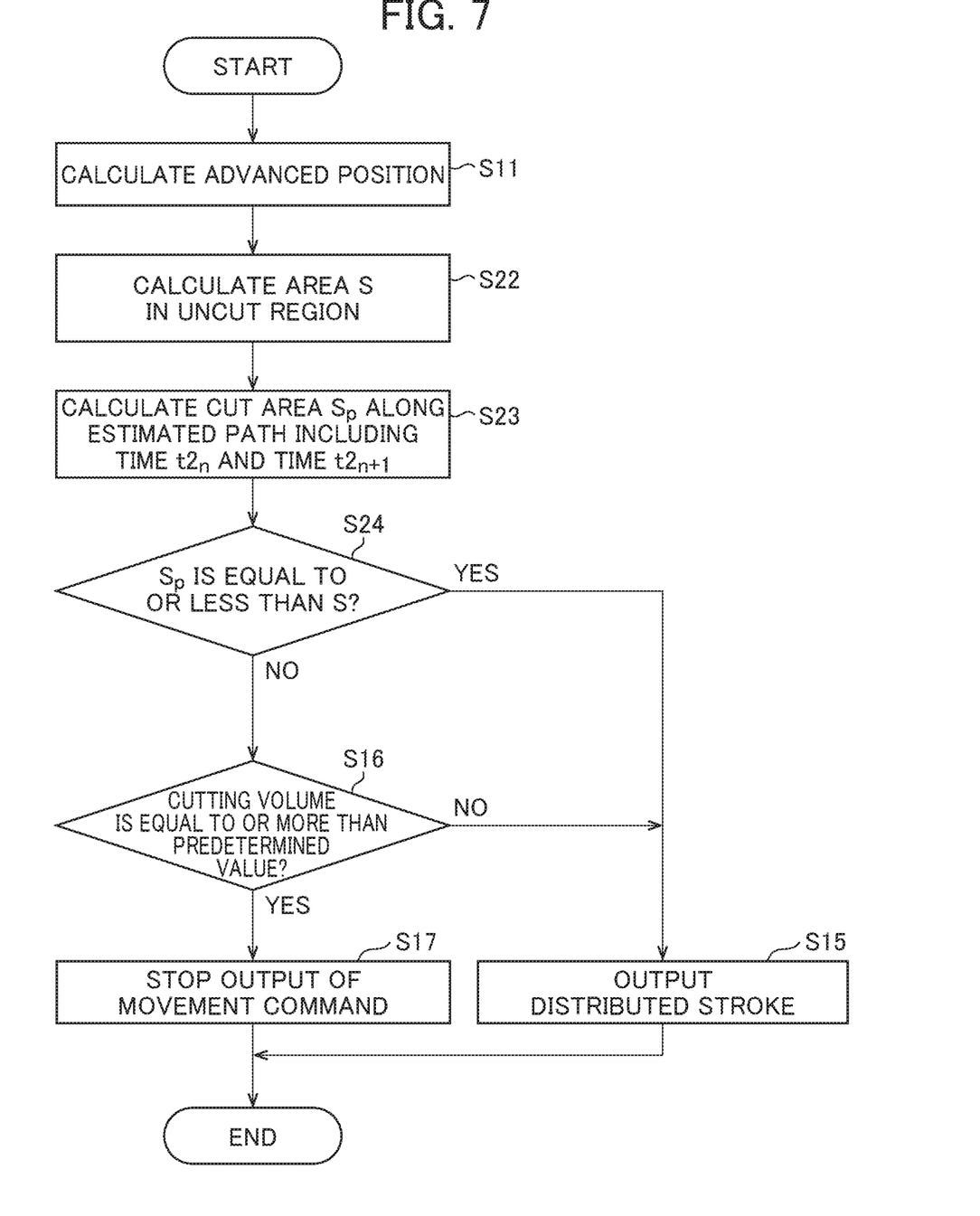
FIG. 7 is a flowchart showing interference check operation by an interference monitoring device according to a second embodiment.

Interference check operation by an interference monitoring device 100 according to the second embodiment will be described next by referring to FIG. 7. FIG. 7 is a flowchart showing the interference check operation by the interference monitoring device 100 according to the second embodiment.

Like in step S11 described above, the advanced position calculation unit 15 calculates the advanced position Pb1 on the command path 1 corresponding to each of the time $t1_N$ and the time $t1_{N+1}$ ahead by a predetermined period of time based on the current position of a movable part, a set and calculated advanced period of time, the look-ahead block command data 21, and an override value (%) input through the feed speed override command unit 4 (S11) (see FIG. 8). Next, as shown in FIGS. 8 and 9, the uncut region calculation unit 16 calculates an error between the estimated shape of the machined part of the workpiece W in the drawing (dashed line in a straight line between the advanced positions Pb1, for example) and an actual shape of the machined part of the workpiece W after machining (solid line along the command end points Pa1, for example) as the uncut region R in the estimated shape of the machined part of the workpiece W in the drawing, and calculates the area S in the uncut region R (S22).

Next, the interference check device 2 calculates the cut area Sp taken along the estimated path based on the calculated advanced positions Pb2 on the current command path 2 corresponding to the time $t2_N$ and the time $t2_{N+1}$ (S23). The interference check device 2 determines whether the calculated cut area Sp is equal to or less than the area S in the uncut region R acquired from the uncut region calculation unit 16 (S24).

When the cut area Sp is equal to or less than the area S, the interference check device 2 determines that current machining is being performed in the uncut region R, and the interference check device 2 does not check interference between the tool T and the workpiece W and does not output an axis stop command to the movement command output unit 12. In this case, the movement command output unit 12 outputs a distributed strokes (S15), the acceleration/deceleration processing unit 13 performs acceleration/deceleration processing, and the servo control unit 14 gives a command to drive the servo motor 3.

When the cut area Sp is larger than the area S, the interference check device 2 determines that the current machining is being performed in a region other than the uncut region R. Then, the interference check device 2 checks interference between the tool T and the workpiece W at the advanced position Pb2. When a cutting volume is equal to or more than a predetermined value (when YES in S16), the interference check device 2 outputs an axis stop command to the movement command output unit 12. In response to this, the movement command output unit 12 stops output of a movement command (S17) to stop the command to drive the servo motor 3. When the interference check device 2 determines that the cutting volume is less than the predetermined value (when NO in S16) as a result of making of a check of interference between the tool T and the workpiece W at the advanced positions Pb2, the interference check device 2 does not output an axis stop command to the movement command output unit 12. In response to this, the foregoing process in step S15 is performed. The foregoing operation is repeated for every block in the program and in every distribution cycle.

As described above, the numerical controller 1 of the second embodiment can achieve advantages comparable to those of the first embodiment.

The present invention should not be limited to the embodiments described above but various changes and modifications are applicable to the present invention. For example, in the foregoing embodiments, a machine tool that moves a tool has been described. However, the features of the present invention should not be limited to this machine tool but are further applicable to a machine tool that moves a workpiece.

The interference monitoring device 100 described in the foregoing embodiments checks interference between a tool and a workpiece in a machine tool. However, the features of the present invention should not be limited to this machine tool but are further applicable to an interference monitoring device that checks interference between tools and workpieces in various types of machines such as industrial machines or industrial robots.

EXPLANATION OF REFERENCE NUMERALS

1 Numerical controller
2 Interference check device (interference check unit)
3 Servo motor
4 Feed speed override command unit
10 Command analysis unit
11 Distribution processing unit
12 Movement command output unit
13 Acceleration/deceleration processing unit
14 Servo control unit
15 Advanced position calculation unit
16 Uncut region calculation unit
20 Program
21 Look-ahead block command data
100 Interference monitoring device

What is claimed is:

1. An interference monitoring device that makes a check on interference between a tool and a workpiece in a machine for performing predetermined machining on the workpiece while moving the tool and the workpiece relative to each other based on a program, the interference monitoring device comprising:
a processor configured to:
calculate an advanced position of the tool or the workpiece ahead by a predetermined period of time based on the program;
draw an estimated shape of a machined part of the workpiece based on the advanced position, and make the interference check based on the estimated shape of the machined part of the workpiece; and
calculate an error between the estimated shape of the machined part of the workpiece and a stored shape of the machined part of the workpiece as an uncut region in the estimated shape of the machined part of the workpiece, wherein
the interference check is not made in the uncut region,
the estimated shape of the machined part of the workpiece is drawn while the machining is being performed, and
the stored shape of the machined part of the workpiece is stored prior to the machining being performed.

2. The interference monitoring device according to claim 1, wherein the processor is further configured to calculate a maximum width in the uncut region, and
when an offset width between an estimated path based on an advanced position on a last command path and an estimated path based on an advanced position on a current command path is equal to or less than the maximum width in the uncut region, the processor determines that the current command path is to pass through the uncut region, and does not make the interference check.

3. The interference monitoring device according to claim 2, wherein the processor is further configured to:
calculate traveling direction vectors via from a calculated advanced position corresponding to time $t_N$ to a plurality of command positions, and calculate a traveling direction vector vib from the calculated advanced position corresponding to the time $t_N$ to a calculated advanced position corresponding to time $t_{N+1}$, the plurality of command positions being command positions between the calculated advanced position corresponding to the time $t_N$ and the calculated advanced position corresponding to the time $t_{N+1}$,
convert the traveling direction vector vib to a unit vector,
calculate the absolute value of the outer product of the unit vector and each of the traveling direction vectors via, thereby obtaining a normal direction offset width of each of the traveling direction vectors via to the traveling direction vector vib, and
define a maximum of the offset widths as the maximum width in the uncut region.

4. The interference monitoring device according to claim 1, wherein the processor is further configured to calculate an area in the uncut region, and
when an area of current machining is equal to or less than the area in the uncut region, the processor determines that the current machining is being performed in the uncut region and does not make the interference check.

5. The interference monitoring device according to claim 4, wherein the processor is further configured to:
calculate traveling direction vectors vi from a calculated advanced position corresponding to time $t_N$ to a plurality of command positions, and calculate a traveling direction vector vi from the calculated advanced position corresponding to the time $t_N$ to a calculated advanced position corresponding to time $t_{N+1}$, the plurality of command positions being command positions between the calculated advanced position corresponding to the time $t_N$ and the calculated advanced position corresponding to the time $t_{N+1}$,
obtain an area si in a region surrounded by the traveling direction vector vi and a traveling direction vector vi+1 adjacent to each other, and
define the total sum of the areas si from the time $t_N$ to the time $t_{N+1}$ as the area in the uncut region.

* * * * *